(12) United States Patent
Kim

(10) Patent No.: US 8,982,475 B2
(45) Date of Patent: Mar. 17, 2015

(54) ZOOM LENS AND PHOTOGRAPHING APPARATUS HAVING THE SAME

(71) Applicant: Samsung Electronics Co., Ltd., Suwon-si, Gyeonggi-do (KR)

(72) Inventor: Dong-woo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/938,444

(22) Filed: Jul. 10, 2013

(65) Prior Publication Data

US 2014/0078596 A1    Mar. 20, 2014

(30) Foreign Application Priority Data

Sep. 14, 2012 (KR) .................. 10-2012-0102270

(51) Int. Cl.
  *G02B 15/14* (2006.01)
  *H04N 5/225* (2006.01)
  *G02B 15/173* (2006.01)

(52) U.S. Cl.
  CPC .............. *G02B 15/14* (2013.01); *H04N 5/225* (2013.01); *G02B 15/173* (2013.01)
  USPC .......................................... 359/683; 348/340

(58) Field of Classification Search
  CPC ..... G02B 15/14; G02B 15/173; H04N 5/2254
  USPC ................... 348/340; 359/676, 683
  See application file for complete search history.

(56) References Cited

U.S. PATENT DOCUMENTS

| 7,593,165 | B2 | 9/2009 | Souma |
| 8,379,114 | B2 | 2/2013 | Touchi et al. |
| 8,542,446 | B2 | 9/2013 | Bito |
| 2008/0285150 | A1 | 11/2008 | Souma |
| 2009/0046374 | A1 | 2/2009 | Ohtake |
| 2009/0116120 | A1 | 5/2009 | Saruwatari |

(Continued)

FOREIGN PATENT DOCUMENTS

| EP | 2 124 082 A1 | 11/2009 |
| EP | 2 708 933 A1 * | 3/2014 |
| JP | 2008-304708 A | 12/2008 |
| JP | 2009-025364 A | 2/2009 |

(Continued)

OTHER PUBLICATIONS

Extended Search Report established for EP 13177429.1 (Nov. 25, 2013).

*Primary Examiner* — David N Spector
(74) *Attorney, Agent, or Firm* — Drinker Biddle & Reath LLP

(57) ABSTRACT

A zoom lens includes: a first lens group having a positive refractive power and including a plurality of lenses, a second lens group having a negative refractive power, a third lens group having a positive refractive power, a fourth lens group having a negative refractive power and including one lens, and a fifth lens group having a positive refractive power and including one lens. The first through fifth lens groups are subsequently arranged from an object side. An interval between neighboring lens groups changes during zooming from a wide angle position to a telephoto position. The zoom lens satisfies the following inequality, $0.4 \leq n1 - n2 \leq 0.7$, where "n1" denotes a refractive index of a first lens from the object side in the first lens group, and "n2" denotes a refractive index of the second lens from the object side in the first lens group.

18 Claims, 13 Drawing Sheets

(56) References Cited

U.S. PATENT DOCUMENTS

| | | |
|---|---|---|
| 2011/0261250 A1 | 10/2011 | Touchi et al. |
| 2011/0286105 A1 | 11/2011 | Yamanaka et al. |
| 2011/0292253 A1 | 12/2011 | Nishio |
| 2012/0194730 A1 | 8/2012 | Morooka et al. |

FOREIGN PATENT DOCUMENTS

| | | |
|---|---|---|
| JP | 2011-232543 A | 11/2011 |
| JP | 2012-032842 A | 2/2012 |
| WO | WO 2012/101959 A1 | 8/2012 |

* cited by examiner

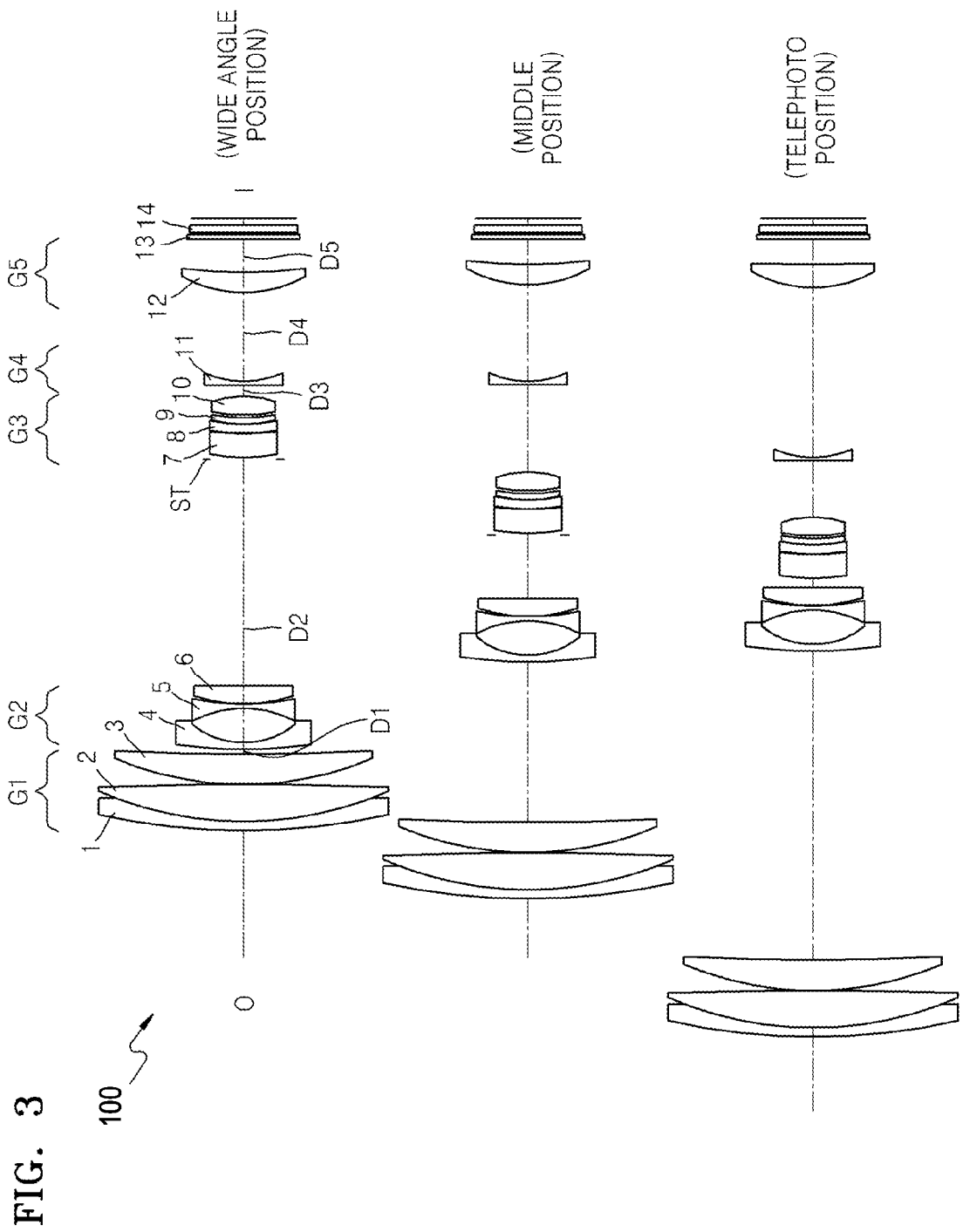

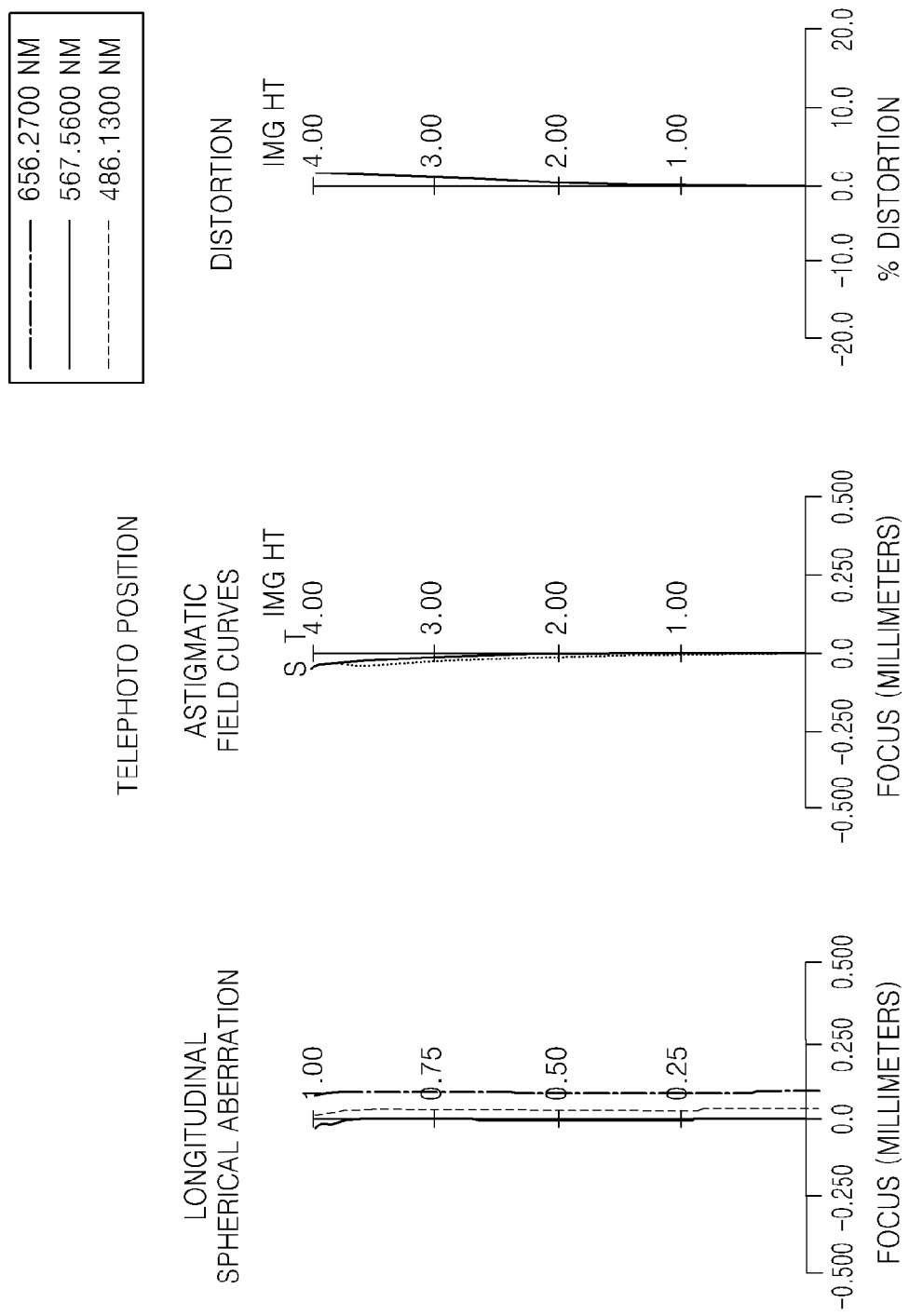

ZOOM LENS AND PHOTOGRAPHING APPARATUS HAVING THE SAME

CROSS-REFERENCE TO RELATED PATENT APPLICATIONS

This application claims the priority benefit of Korean Patent Application No. 10-2012-0102270, filed on Sep. 14, 2012, in the Korean Intellectual Property Office, the disclosure of which is incorporated herein in its entirety by reference.

BACKGROUND

1. Field

Various embodiments of the invention relate to a high magnification compact zoom lens and a photographing apparatus having the zoom lens.

2. Related Art

Photographing apparatuses such as digital cameras using interchangeable lenses and video cameras using solid state image devices are required to have high resolution and high magnification. Also, along with increased consumer knowledge about photographing apparatuses, there is a demand for a compact high magnification optical system for use with a zoom lens in a digital camera or a digital camcorder using a CCD or CMOS. However, it is difficult to manufacture an optical system that has high resolution and high magnification and is also compact.

SUMMARY

Various embodiment of the invention provide a high magnification compact zoom lens.

Various embodiments also provide a photographing apparatus including a high magnification compact zoom lens.

According to an embodiment, a zoom lens includes: a first lens group having a positive refractive power and including a plurality of lenses, a second lens group having a negative refractive power, a third lens group having a positive refractive power, a fourth lens group having a negative refractive power and including one lens, and a fifth lens group having a positive refractive power and including one lens, wherein the first through fifth lens groups are arranged sequentially from an object side, an interval between neighboring lens groups changes during zooming from a wide angle position to a telephoto position, and the zoom lens satisfies the following inequality, $$0.4 \le n1-n2 \le 0.7,$$

where "n1" denotes a refractive index of a first lens from the object side in the first lens group, and "n2" denotes a refractive index of the second lens from the object side in the first lens group.

The second lens group may include three lenses, and a first lens from the object side of the second lens may be an aspherical lens.

The zoom lens may satisfy the following inequality, $1.8 \le n6 \le 2.2$, where "n6" denotes a refractive index of a lens closest to an image side in the second lens group.

A first lens from the object side in the second lens group may be an aspherical lens.

The second lens group may include a negative aspherical meniscus lens that is convex toward the object side, a biconcave negative lens, and a positive meniscus lens that is convex toward the object side.

A first lens from the object side in the third lens group may be an aspherical lens.

The third lens group may include a doublet lens.

The third lens group may include four lenses, and three of the four lenses arranged sequentially from an object side are meniscus lenses.

Three of the four lenses arranged sequentially from the object side in the third lens group may be meniscus lenses that are convex toward the object side.

A lens closest to an image side in the third lens group may be a biconvex lens.

The one lens included in the fourth lens group may be a meniscus lens that is convex toward the object side.

The one lens included in the fifth lens group may be a meniscus lens that is convex toward the object side.

Lenses of the fourth and fifth lens groups may be formed of plastic.

The one lens of the fourth lens group and the one lens of the fifth lens group may respectively satisfy the following inequalities, $$1.45 \le n11 \le 1.65 \text{ and}$$

$$1.45 \le n12 \le 1.65,$$

where, "n11" denotes a refractive index of a lens included in the fourth lens group, and "n12" denotes a refractive index of a lens included in the fifth lens group.

The third lens group may include an aperture stop.

The fifth lens group may perform focusing.

The zoom lens may have a zoom ratio of 15× or higher.

According to another embodiment, a photographing apparatus includes a zoom lens and an imaging device for receiving an image formed by the zoom lens. The zoom lens includes a first lens group having a positive refractive power and including a plurality of lenses, a second lens group having a negative refractive power, a third lens group having a positive refractive power, a fourth lens group having a negative refractive power and including one lens, and a fifth lens group having a positive refractive power and including one lens, wherein the first through fifth lens groups are arranged sequentially from an object side, an interval between neighboring lens groups changes during zooming from a wide angle position to a telephoto position, and the zoom lens satisfies the following inequality, $$0.4 \le n1-n2 \le 0.7,$$

where "n1" denotes a refractive index of a first lens from the object side in the first lens group, and "n2" denotes a refractive index of the second lens from the object side in the first lens group.

BRIEF DESCRIPTION OF THE DRAWINGS

The above and other features and advantages will become more apparent by describing in detail exemplary embodiments thereof with reference to the attached drawings in which:

FIG. 3 is a diagram schematically illustrating a zoom lens at a wide angle position, a middle position, and a telephoto position, according to a second embodiment;

FIGS. 8A and 8B are aberration diagrams of the zoom lens of FIG. 7 at the wide angle position and the telephoto position.

DETAILED DESCRIPTION

Figure 1:
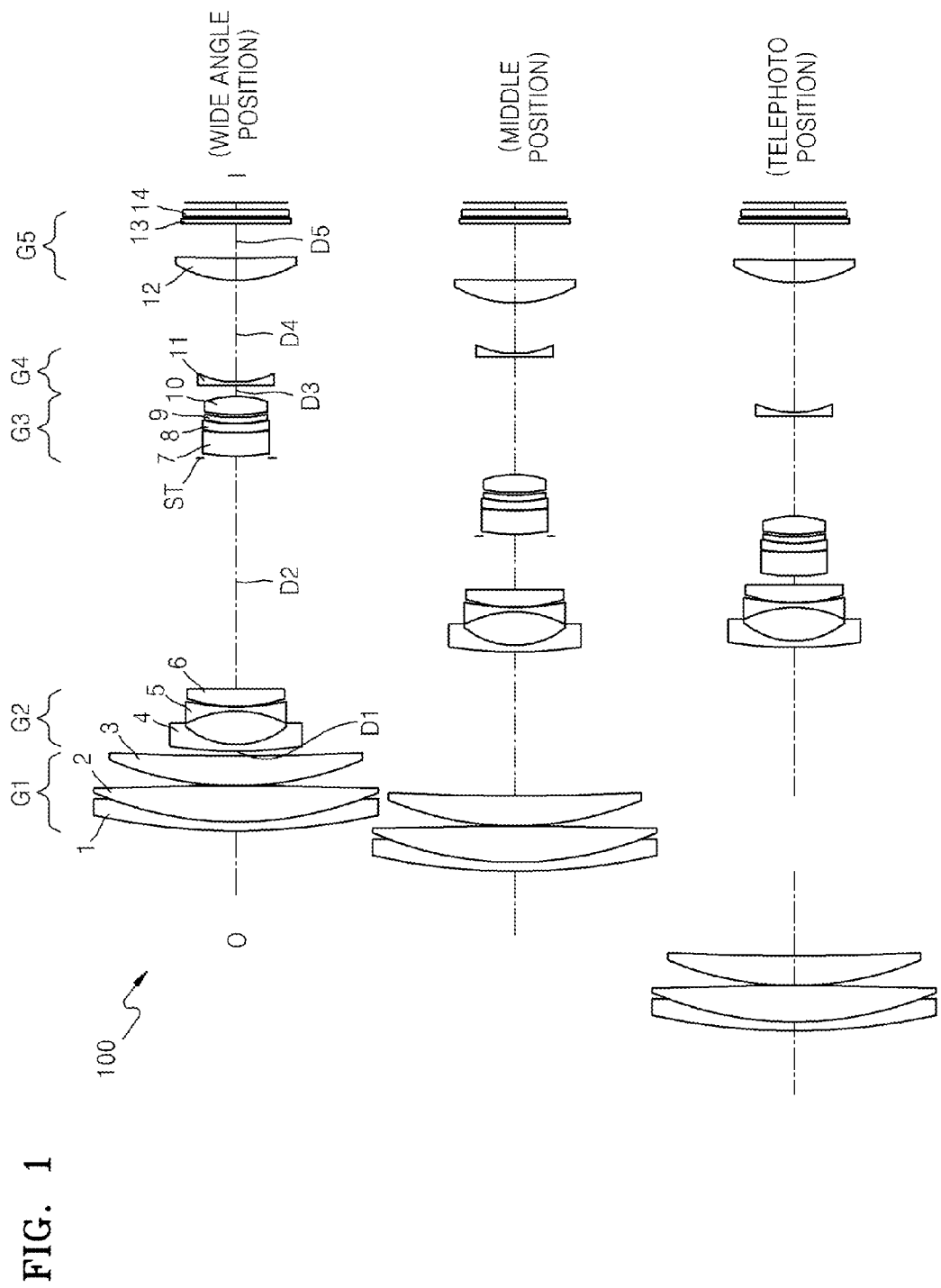
FIG. 1 is a diagram schematically illustrating a zoom lens at a wide angle position, a middle position, and a telephoto position, according to a first embodiment.

The attached drawings for illustrating exemplary embodiments are referred to in order to gain a sufficient understanding of the invention, the merits thereof, and the objectives accomplished by the implementation of the invention. Hereinafter, the invention will be described in detail by explaining exemplary embodiments with reference to the attached drawings. Like reference numerals in the drawings denote like elements.

Expressions such as "at least one of," when preceding a list of elements, modify the entire list of elements and do not modify the individual elements of the list.

FIG. 1 is a diagram schematically illustrating a zoom lens 100 at a wide angle position, a middle position, and a telephoto position, according to a first embodiment. Referring to FIG. 1, the zoom lens 100 according to the present embodiment may include, in an order from an object side O to an image side I, a first lens group G1 having a positive refractive power, a second lens group G2 having a negative refractive power, a third lens group G3 having a positive refractive power, a fourth lens group G4 having a negative refractive power, and a fifth lens group G5 having a positive refractive power. At least one filter 13 or 14 may be provided at the image side I of the fifth lens group G5.

The zoom lens 100 may have a high zoom ratio of 15× or higher. In the zoom lens 100, all of the first to fifth lens groups G1, G2, G3, G4, and G5 may move during zooming. For example, during zooming from the wide angle position to the telephoto position, a distance D1 between the first lens group G1 and the second lens group G2 may increase, and a distance D2 between the second lens group G2 and the third lens group G3 may decrease. A distance D3 between the third lens group G3 and the fourth lens group G4 may increase and then decrease, and a distance D4 between the fourth lens group G4 and the fifth lens group G5 may decrease and then increase. A distance D5 between the fifth lens group G5 and the at least one filter 13 or 14 may increase and then decrease. Alternatively, the distance D5 may monotonously decrease.

In the present embodiment, a mechanism for moving the lens groups by reducing the amount of movement of each lens group during zooming from the wide angle position to the telephoto position is simple so that a lens barrel may be made compact.

The first lens group G1 may include a plurality of lenses. For example, the first lens group G1 may include a first lens 1, a second lens 2, and a third lens 3. The first lens 1 has a negative refractive power, the second lens 2 has a positive refractive power, and the third lens 3 has a positive refractive power. The first lens 1 may be, for example, a meniscus lens that is convex toward the object side O. The second lens 2 may be a biconvex lens. The third lens 3 may be a meniscus lens that is convex toward the object side O. The first lens 1 and the second lens 2 may be a doublet lens.

The first lens group G1 may satisfy the following inequality.

$$0.4 \leq n1 - n2 \leq 0.7 \quad \text{[Inequality 1]}$$

In Inequality 1, "n1" denotes a refractive index of the first lens 1 from the object side O in the first lens group G1, and "n2" denotes a refractive index of the second lens 2 from the object side O in the first lens group G1.

Inequality 1 shows a difference in the refractive index between the first lens 1 and the second lens 2 from the object side O in the first lens group G1. The reduction of a total length of the zoom lens 100 and the correction of chromatic aberration at the telephoto position may be easily performed by satisfying Inequality 1. When "n1−n2" exceeds the upper limit, aberration may be corrected but the material costs may increase. When "n1−n2" is less than the lower limit, the chromatic aberration correction and the total length reduction of the zoom lens 100 at the telephoto position become difficult, and thus, it is difficult to make the zoom lens 100 compact.

Since the diameter of a lens of the first lens group G1 at the object side O is relatively larger than that of each lens of the other lens groups, the total cost of the zoom lens 100 may be reduced by lowering the cost of the lens of the first lens group G1. Accordingly, the manufacturing costs may be reduced as the first lens 1 and the second lens 2 are configured to satisfy Inequality 1. For example, the first lens 1 from the object side O in the first lens group G1 may have a relatively high refractive index, whereas the second lens 2 from the object side O in the first lens group G1 may have a relatively low refractive index. For example, the first lens from the object side O, i.e., the first lens 1, in the first lens group G1 may be a high refractive lens having a refractive index of about 1.95 or higher, whereas the second lens from the object side O, i.e., the second lens 2, in the first lens group G1 may be a low refractive lens having a refractive index of about 1.5 or lower. The zoom lens 100 may be miniaturized by combining the first and second lenses 1 and 2. Also, the first lens 1 may be formed of a material having an Abbe number of 30 or lower, and the second lens 2 may be formed of a material having an Abbe number of 80 or higher, and thus, chromatic aberration may be easily corrected.

The third lens 3 may be, for example, a meniscus lens that is convex toward the object side O. Accordingly, chromatic aberration at the telephoto position, and distortion and astigmatism at the wide angle position may be easily corrected.

The second lens group G2 may include three lenses, for example, a fourth lens 4, a fifth lens 5, and a sixth lens 6. The fourth lens 4 may have a negative refractive power, the fifth lens 5 may have a negative refractive power, and the sixth lens 6 may have a positive refractive power. The fourth lens 4 may be a meniscus lens that is convex toward the object side O. The fifth lens 5 may be a biconcave lens. The sixth lens 6 may be a meniscus lens that is convex toward the object side O. The fourth lens 4 may be an aspherical lens. The second lens group G2 may easily correct astigmatism.

The second lens group G2 may satisfy the following inequality.

$$1.8 \leq n6 \leq 2.2 \quad \text{[Inequality 2]}$$

In Inequality 2, "n6" denotes a refractive index of a lens closest to the image side I in the second lens group G2, e.g., the sixth lens 6. As the second lens group 2 satisfies Inequality 2, lateral aberration and astigmatism in a peripheral portion of a lens at the wide angle position may be easily corrected. Since the amount of movement of the second lens group G2 during zooming and the sum of thicknesses of the lenses of the second lens group G2 are reduced, the zoom lens 100 may be miniaturized.

The lens closest to the object side O and the lens closest to the image side I in the second lens group G2 (e.g., the fourth lens 4 and the sixth lens 6) may be high refractive lenses having relatively high refractive indexes compared to other lens groups. Accordingly, during zooming from the wide angle position to the telephoto position, the amount of movement of the second lens group G2 may be reduced and a high zoom ratio may be obtained.

The third lens group G3 may include four lenses, for example, a seventh lens 7, an eighth lens 8, a ninth lens 9, and a tenth lens 10. The seventh lens 7 may be an aspherical lens and may reduce spherical aberration. Each of the seventh lens 7, the eighth lens 8, and the ninth lens 9 may be a meniscus lens. Each of the seventh lens 7, the eighth lens 8, and the ninth lens 9 may be, for example, a meniscus lens that is convex toward the object side O. As three meniscus lenses (e.g., the seventh lens 7, the eighth lens 8, and the ninth lens 9) are arranged in an order from the object side O in the third lens group G3, the lenses in the third lens group G3 may easily obtain an appropriate thickness in a peripheral portion of the third lens group G3 during processing of a lens. Thus, the thickness of the lens is reduced, and thus, the zoom lens 100 may be miniaturized.

The tenth lens 10 may be a biconvex lens. The eighth lens 8 and the ninth lens 9 may be formed, for example, by combining a positive lens and a negative lens. As the third lens group G3 is configured as above, chromatic aberration of magnification occurring during zooming may be reduced. An aperture stop ST may be provided at the position closest to the object side O in the third lens group G3. The size of the aperture stop ST may not change during zooming from the wide angle position to the telephoto position. For example, an F number Fno may be about 5.8 at the telephoto position and about 3.3 at the wide angle position. Also, an amount of an increase in the total length of the zoom lens 100 at the telephoto position may be reduced by making the movement amounts of the second and third lens groups G2 and G3 almost the same during zooming from the wide angle position to the telephoto position.

The fourth lens group G4 may include one lens. For example, the fourth lens group G4 may include an eleventh lens 11 having a meniscus shape that is convex toward the object side O.

The fifth lens group G5 may include one lens. For example, the fifth lens group G5 may include a twelfth lens 12 having a meniscus shape that is convex toward the object side O. Since the eleventh and twelfth lenses 11 and 12 of the fourth and fifth groups G4 and G5 are meniscus lenses convex toward the object side O, distortion and astigmatism at the telephoto position may be easily corrected. Also, since both of the fourth and fifth lens groups G4 and G5 have meniscus lenses having the same shape, the zoom lens 100 may be miniaturized when the lenses are housed in a barrel (not shown).

The fourth and fifth lens groups G4 and G5 may satisfy the following inequalities.

$$1.45 \leq n11 \leq 1.65 \quad \text{[Inequality 3]}$$

$$1.45 \leq n12 \leq 1.65 \quad \text{[Inequality 4]}$$

In Inequalities 3 and 4, "n11" denotes a refractive index of a lens included in the fourth lens group G4 (e.g., the eleventh lens 11), and "n12" denotes a refractive index of a lens included in the fifth lens group G5 (e.g., the twelfth lens 12).

When the fourth and fifth lens groups G4 and G5 satisfy Inequalities 3 and 4, an incident angle of a light ray incident on an image surface (IMG) does not increase, and thus, the costs for a lens material may be reduced. For example, the eleventh and twelfth lenses 11 and 12 may be formed of plastic. Thus, a change in field curvature aberration in a peripheral portion of a lens according to a change in an object distance may be reduced. Also, the eleventh and twelfth lenses 11 and 12 may be aspherical lenses.

When the lenses of the fourth and fifth lens groups G4 and G5 are all meniscus lenses that are convex toward the object side O, astigmatism during zooming and distortion at the telephoto position may be easily corrected. Also, as focal lengths of plastic lenses of the fourth and fifth lens groups G4 and G5 are designed to be similar to each other, a change in a focal position according to a change in temperature may be reduced. Since the lenses of the fourth and fifth lens groups G4 and G5 are plastic lenses, the manufacturing costs may be reduced.

An aspherical surface used for the zoom lens 100 according to the present embodiment is defined as follows.

When it is assumed that an optical axis direction is an X-axis and a direction perpendicular to the optical axis direction is a Y-axis, and a direction in which a light ray proceeds is positive, the shape of an aspherical surface may be given by the following equation.

$$x = \frac{cy^2}{1+\sqrt{1-(K+1)c^2y^2}} + Ay^4 + By^6 + Cy^8 + Dy^{10} \quad \text{[Equation 5]}$$

In Equation 5, "x" denotes a distance in the optical axis direction from the vertex of a lens, "y" denotes a distance in the direction perpendicular to the optical axis, "K" denotes a conic constant, "A", "B", "C", and "D" denote aspherical surface coefficients, and "c" denotes the reciprocal (1/R) of a radius of curvature at the vertex of a lens.

Design data of the zoom lens 100 according to the present embodiment is described below. In the following description, "f" denotes a total focal length in millimeters, "Fno" denotes an F number, "2ω" denotes a viewing angle in degrees, "R" denotes a radius of curvature, "Dn" denotes a distance between lenses or a thickness of a lens, "Nd" denotes a refractive index, "Vd" denotes an Abbe number, "ST" denotes an aperture stop, "OBJ" denotes a surface of an object, and "ASP" denotes an aspherical surface. In each embodiment, at least one filter 13 or 14 may be provided at the position closest to the image side I.

First Embodiment

FIG. 1 is a view schematically illustrating a telephoto zoom lens 100 at a wide angle position, a middle position, and a telephoto position, according to a first embodiment. The following table shows design data according to the first embodiment. In the table, each of lens surface symbols S1, S2, . . . , Sn indicates a surface of a lens in an order from the first surface of the lens closest to the object side O, and the lens surface symbols are omitted in the drawings. The values for the total focal length "f", the F number "Fno", and the viewing angle "2ω" at the wide angle position, the middle position, and the telephoto position are respectively shown below.
f:    4.43~19.10~74.90    Fno:    3.37~4.92~5.85    2ω: 84.13~23.64~6.11

TABLE 1

| Lens Surface | R | Dn | Nd | Vd |
|---|---|---|---|---|
| OBJ | INFINITY | INFINITY | | |
| S1 | 44.27658 | 0.800000 | 2.0010 | 29.134 |
| S2 | 27.54628 | 2.836512 | 1.496997 | 81.6084 |
| S3 | −252.62422 | 0.120000 | | |
| S4 | 26.05833 | 2.283401 | 1.592824 | 68.6244 |
| S5 | 162.02762 | D1 | | |
| S6 | 43.13229 | 0.400000 | 1.804700 | 40.9400 |
| ASP: | | | | |
| K: 0.000000 | | | | |
| A: −0.839264E−04 | B: 0.722980E−06 | C: 0.129371E−06 | D: −0.337873E−08 | |
| S7 | 6.04257 | 2.670387 | | |
| ASP: | | | | |
| K: 0.000000 | | | | |
| A: 0.372349E−04 | B: 0.860248E−05 | C: 0.265400E−06 | D: 0.558217E−07 | |
| S8 | −10.30638 | 0.400000 | 1.804200 | 46.5025 |
| S9 | 20.14389 | 0.100000 | | |
| S10 | 13.32675 | 1.300979 | 2.10205 | 16.77 |
| S11 | 82.12179 | D2 | | |
| ST | INFINITY | 0.100000 | | |
| S13 | 6.16991 | 1.786604 | 1.804700 | 40.9400 |
| ASP: | | | | |
| K: 0.265765 | | | | |
| A: 0.142277E−04 | B: 0.661050E−05 | C: 0.000000E+00 | D: 0.000000E+00 | |
| S14 | 13.72448 | 0.100000 | | |
| ASP: | | | | |
| K: 0.000000 | | | | |
| A: 0.982149E−03 | B: 0.271501E−04 | C: 0.000000E+00 | D: 0.000000E+00 | |
| S15 | 7.14045 | 0.771771 | 1.516798 | 64.1983 |
| S16 | 11.39976 | 0.402763 | 1.922860 | 20.8804 |
| S17 | 5.61582 | 0.392957 | | |
| S18 | 11.79385 | 1.366336 | 1.496997 | 81.6084 |
| S19 | −8.99416 | D3 | | |
| S20 | 37.27152 | 0.450000 | 1.531200 | 56.5000 |
| ASP: | | | | |
| K: −1.000000 | | | | |
| A: 0.269973E−03 | B: 0.460849E−04 | C: −0.168951E−05 | D: −0.151277E−06 | |
| S21 | 8.53931 | D4 | | |
| ASP: | | | | |
| K: 0.800943 | | | | |
| A: 0.199268E−03 | B: 0.442042E−04 | C: −0.927825E−06 | D: −0.201837E−06 | |
| S22 | 9.49666 | 1.606447 | 1.531200 | 56.5000 |
| ASP: | | | | |
| K: 0.000000 | | | | |
| A: −0.330035E−03 | B: 0.101160E−04 | C: 0.000000E+00 | D: 0.000000E+00 | |
| S23 | 33.04208 | D5 | | |
| ASP: | | | | |
| K: 0.000000 | | | | |
| A: −0.517310E−03 | B: 0.981860E−05 | C: 0.000000E+00 | D: 0.000000E+00 | |
| S24 | INFINITY | 0.300000 | 1.516798 | 64.1983 |
| S25 | INFINITY | 0.300000 | | |
| S26 | INFINITY | 0.500000 | 1.516798 | 64.1983 |
| S27 | INFINITY | 0.400000 | | |
| IMG: | INFINITY | | | |

The following table shows a variable distance during zooming according to the first embodiment.

TABLE 2

| Variable Distance | Wide Angle Position | Middle Position | Telephoto Position |
|---|---|---|---|
| D1 | 0.5 | 11.5082 | 24.7592 |
| D2 | 18.3615 | 4.4056 | 0.5 |
| D3 | 0.74 | 9.2581 | 8.1566 |
| D4 | 8.1898 | 3.9795 | 10.153 |
| D5 | 2.7981 | 4.6137 | 2.9907 |

Figure 2A:
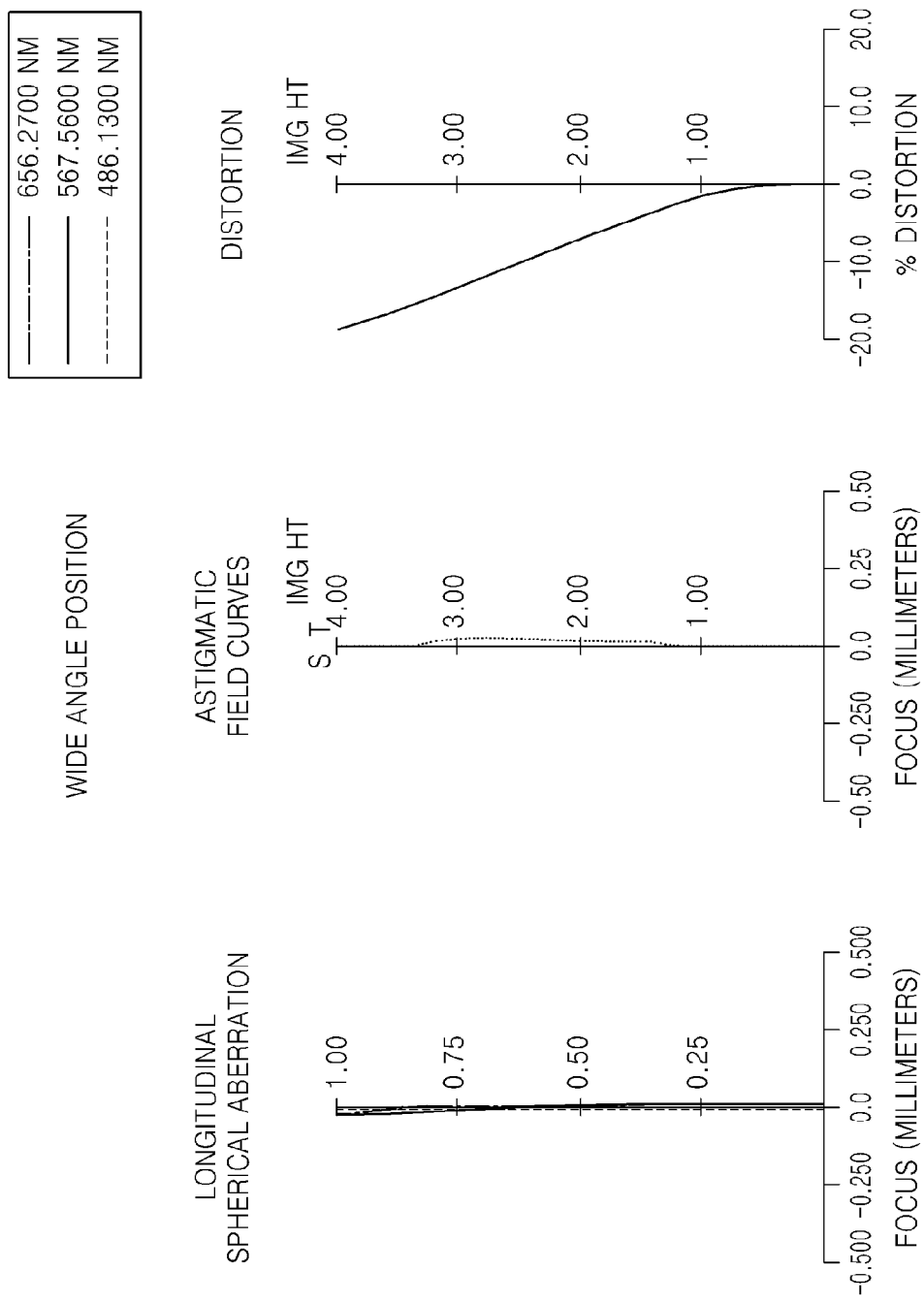
FIGS. 2A and 2B are aberration diagrams of the zoom lens of FIG. 1 at the wide angle position and the telephoto position.
Figure 2B:
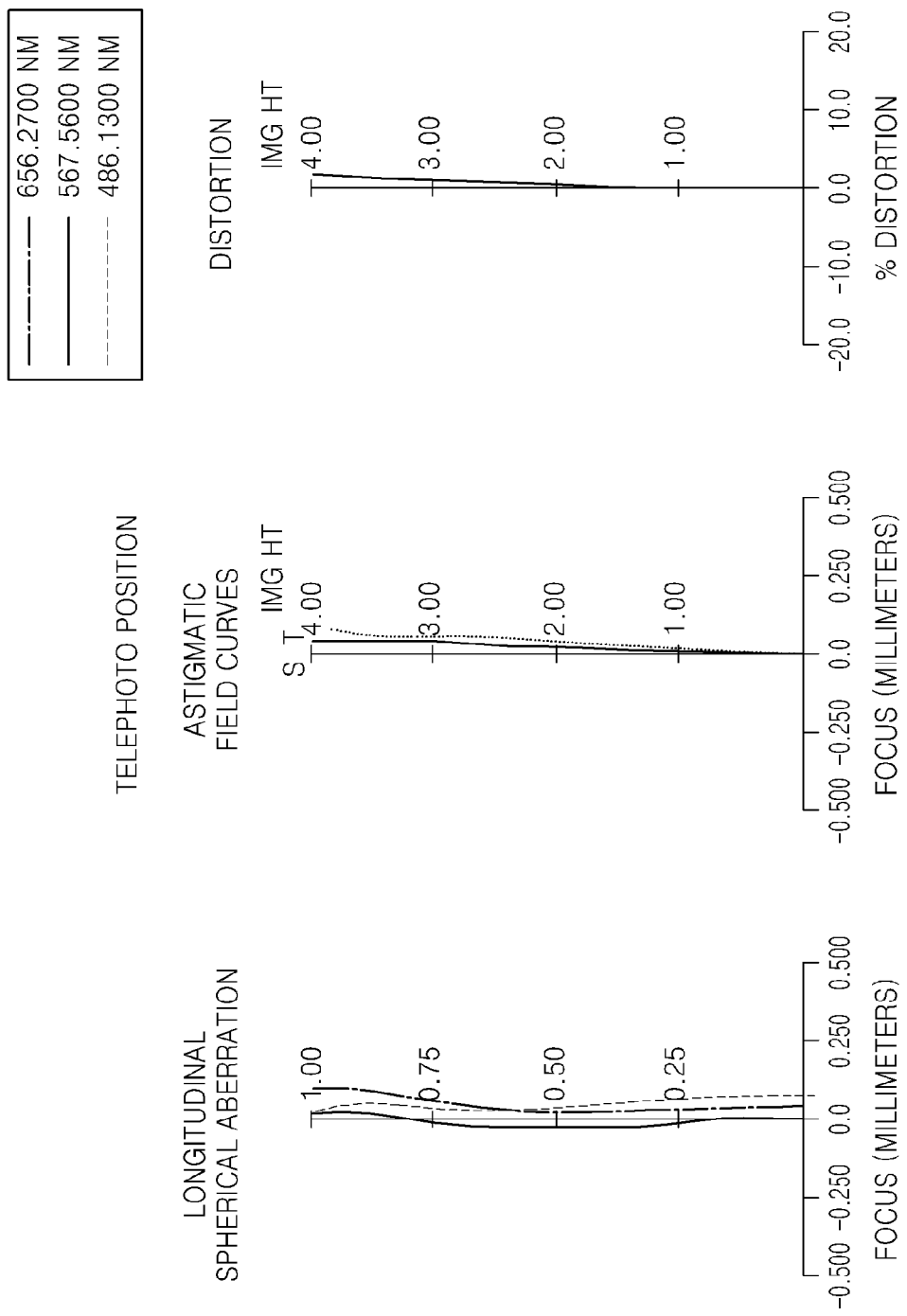

FIGS. 2A and 2B are aberration diagrams showing longitudinal spherical aberration, astigmatic field curves, and distortion of the zoom lens 100 of FIG. 1 at the wide angle position and the telephoto position. The astigmatic field curves include a tangential field curvature (T) and a sagittal field curvature (S).

Second Embodiment

FIG. 3 is a diagram illustrating a zoom lens 100 at a wide angle position, a middle position, and a telephoto position, according to a second embodiment. The following table shows design data according to the second embodiment. The values for the total focal length "f", the F number "Fno", and the viewing angle "2ω" at the wide angle position, the middle position, and the telephoto position are respectively shown below.

f: 4.42~19.91~84.09   Fno: 3.33~5.00~5.57   2ω: 84.21~22.71~5.44

TABLE 3

| Lens Surface | R | Dn | Nd | Vd |
|---|---|---|---|---|
| OBJ | INFINITY | INFINITY | | |
| S1 | 48.28458 | 0.800000 | 2.0010 | 29.134 |
| S2 | 28.99132 | 3.405983 | 1.496997 | 81.6084 |
| S3 | −150.32741 | 0.120000 | | |
| S4 | 25.56824 | 2.630039 | 1.592824 | 68.6244 |
| S5 | 126.44637 | D1 | | |
| S6 | 95.63330 | 0.400000 | 1.804700 | 40.9400 |
| ASP: | | | | |
| K: 0.000000 | | | | |
| A: −0.594020E−04 | B: 0.290982E−05 | C: 0.117451E−06 | D: −0.388612E−08 | |
| S7 | 6.27651 | 2.571400 | | |
| ASP: | | | | |
| K: 0.000000 | | | | |
| A: 0.110666E−03 | B: 0.420768E−05 | C: −0.698777E−06 | D: 0.545948E−07 | |
| S8 | −12.48988 | 0.400000 | 1.804200 | 46.5025 |
| S9 | 15.52267 | 0.100000 | | |
| S10 | 11.37037 | 1.356434 | 2.10205 | 16.77 |
| S11 | 48.07963 | D2 | | |
| ST | INFINITY | 0.100000 | | |
| S13 | 6.17519 | 1.474776 | 1.804700 | 40.9400 |
| ASP: | | | | |
| K: 0.287446 | | | | |
| A: 0.319294E−04 | B: 0.807854E−05 | C: 0.000000E+00 | D: 0.000000E+00 | |
| S14 | 13.74737 | 0.100000 | | |
| ASP: | | | | |
| K: 0.000000 | | | | |
| A: 0.970387E−03 | B: 0.254743E−04 | C: 0.000000E+00 | D: 0.000000E+00 | |
| S15 | 7.16213 | 0.768203 | 1.516798 | 64.1983 |
| S16 | 11.26315 | 0.400000 | 1.922860 | 20.8804 |
| S17 | 5.61970 | 0.407044 | | |
| S18 | 12.14151 | 1.378682 | 1.496997 | 81.6084 |
| S19 | −8.80561 | D3 | | |
| S20 | 30.19478 | 0.450000 | 1.531200 | 56.5000 |
| ASP: | | | | |
| K: −1.000000 | | | | |
| A: 0.292666E−03 | B: 0.507534E−04 | C: −.101671E−05 | D: −.784485E−07 | |
| S21 | 8.80599 | D4 | | |
| ASP: | | | | |
| K: 0.915098 | | | | |
| A: 0.222950E−03 | B: 0.549901E−04 | C: 0.135777E−06 | D: −0.186325E−06 | |
| S22 | 10.22961 | 1.237439 | 1.531200 | 56.5000 |
| ASP: | | | | |
| K: 0.000000 | | | | |
| A: −0.143186E−03 | B: 0.138609E−04 | C: 0.000000E+00 | D: 0.000000E+00 | |
| S23 | 21.96417 | D5 | | |

TABLE 3-continued

ASP:
K: 0.000000
A: −0.202716E−03   B: 0.663208E−05   C: 0.000000E+00   D: 0.000000E+00

| | | | | |
|---|---|---|---|---|
| S24 | INFINITY | 0.300000 | 1.516798 | 64.1983 |
| S25 | INFINITY | 0.300000 | | |
| S26 | INFINITY | 0.500000 | 1.516798 | 64.1983 |
| S27 | INFINITY | 0.400000 | | |
| IMG | INFINITY | | | |

The following table shows a variable distance during zooming according to the second embodiment.

TABLE 4

| Variable Distance | Wide Angle Position | Middle Position | Telephoto Position |
|---|---|---|---|
| D1 | 0.5 | 13.1556 | 26.1174 |
| D2 | 18.4531 | 5.4207 | 0.5 |
| D3 | 1.0429 | 7.3748 | 4.3201 |
| D4 | 7.4496 | 7.6451 | 13.7962 |
| D5 | 2.9241 | 2.5573 | 2.6309 |

Figure 4A:
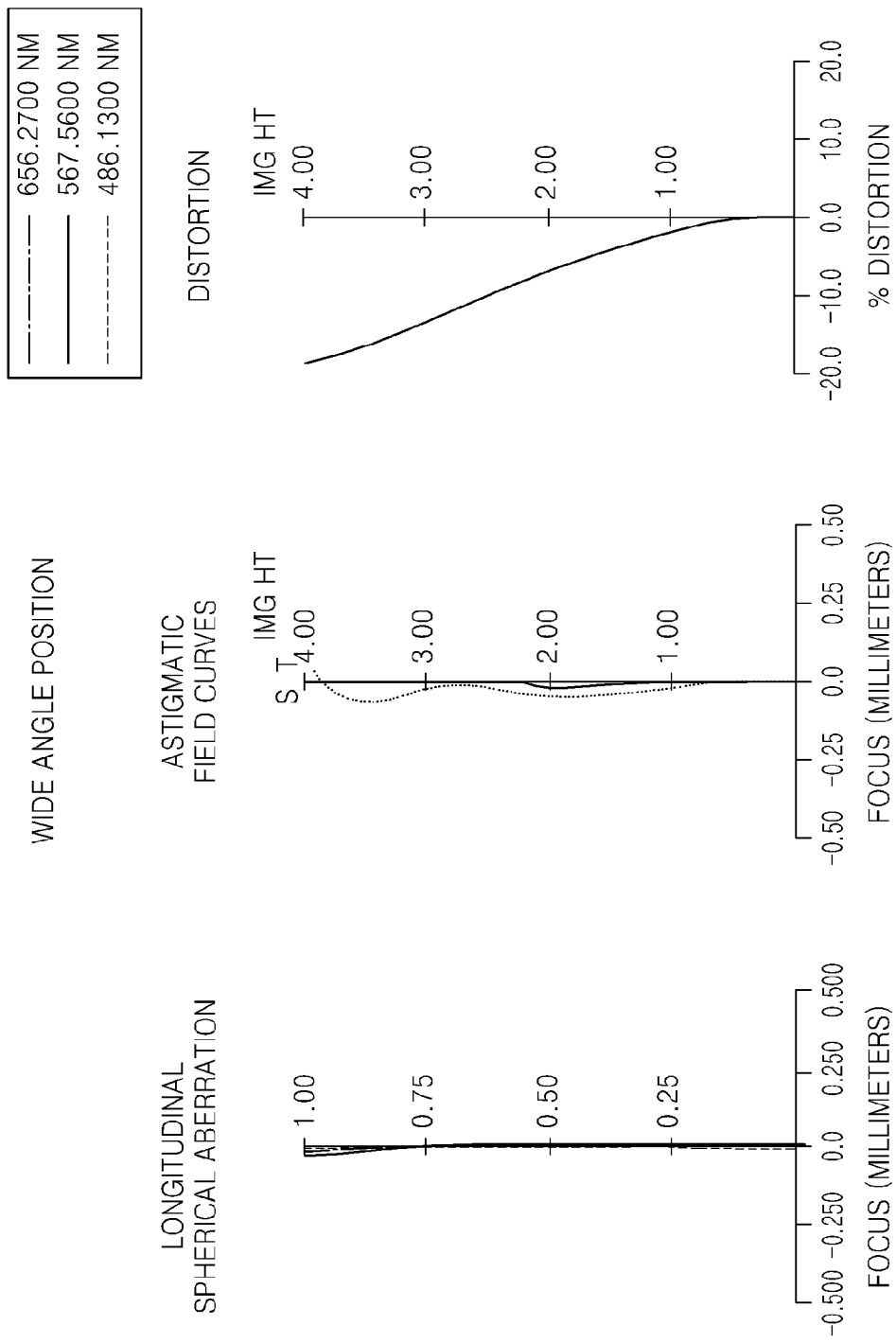
FIGS. 4A and 4B are aberration diagrams of the zoom lens of FIG. 3 at the wide angle position and the telephoto position.
Figure 4B:
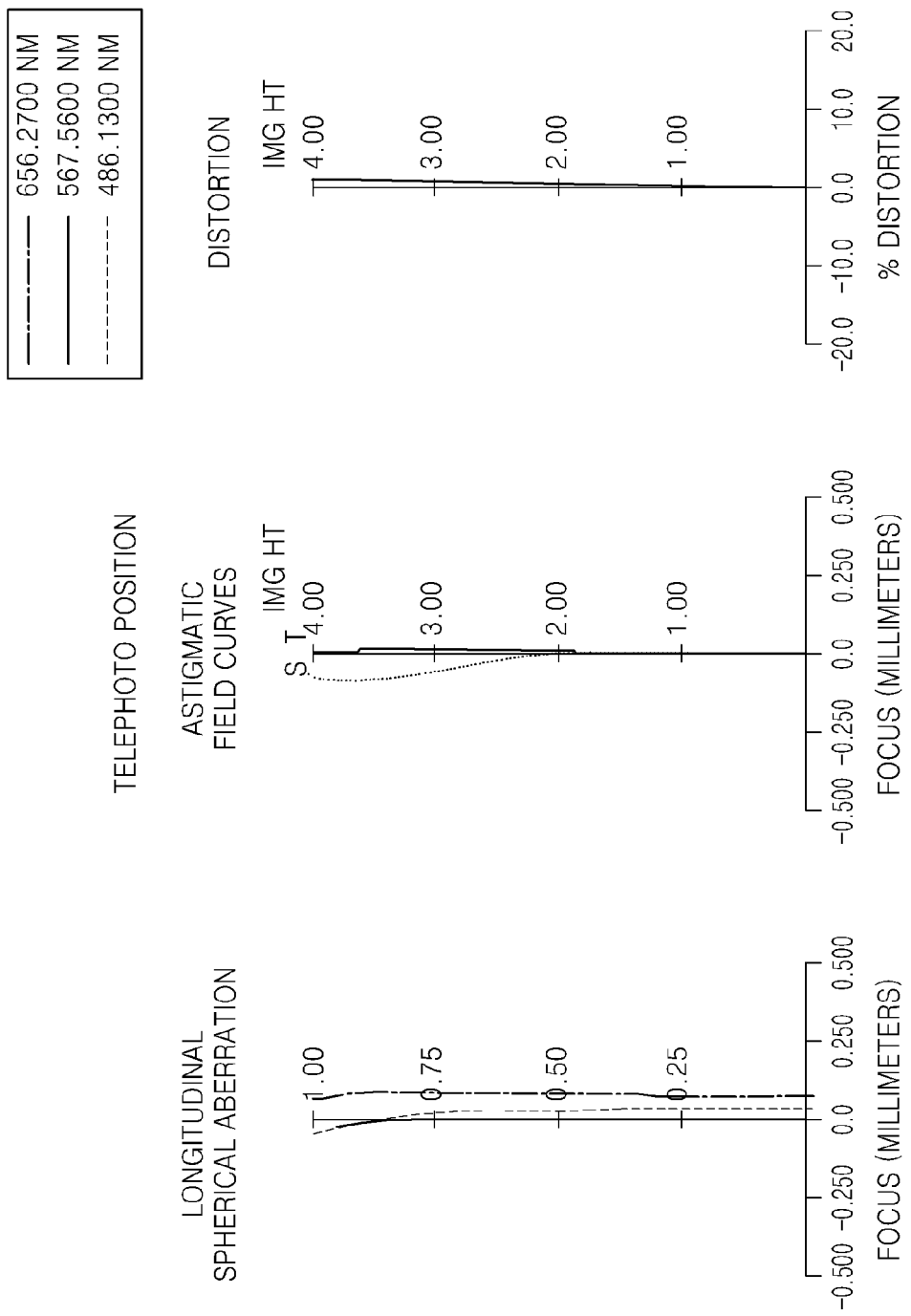

FIGS. 4A and 4B are aberration diagrams showing longitudinal spherical aberration, astigmatic field curves, and distortion of the zoom lens 100 of FIG. 3 at the wide angle position and the telephoto position.

Third Embodiment

Figure 5:
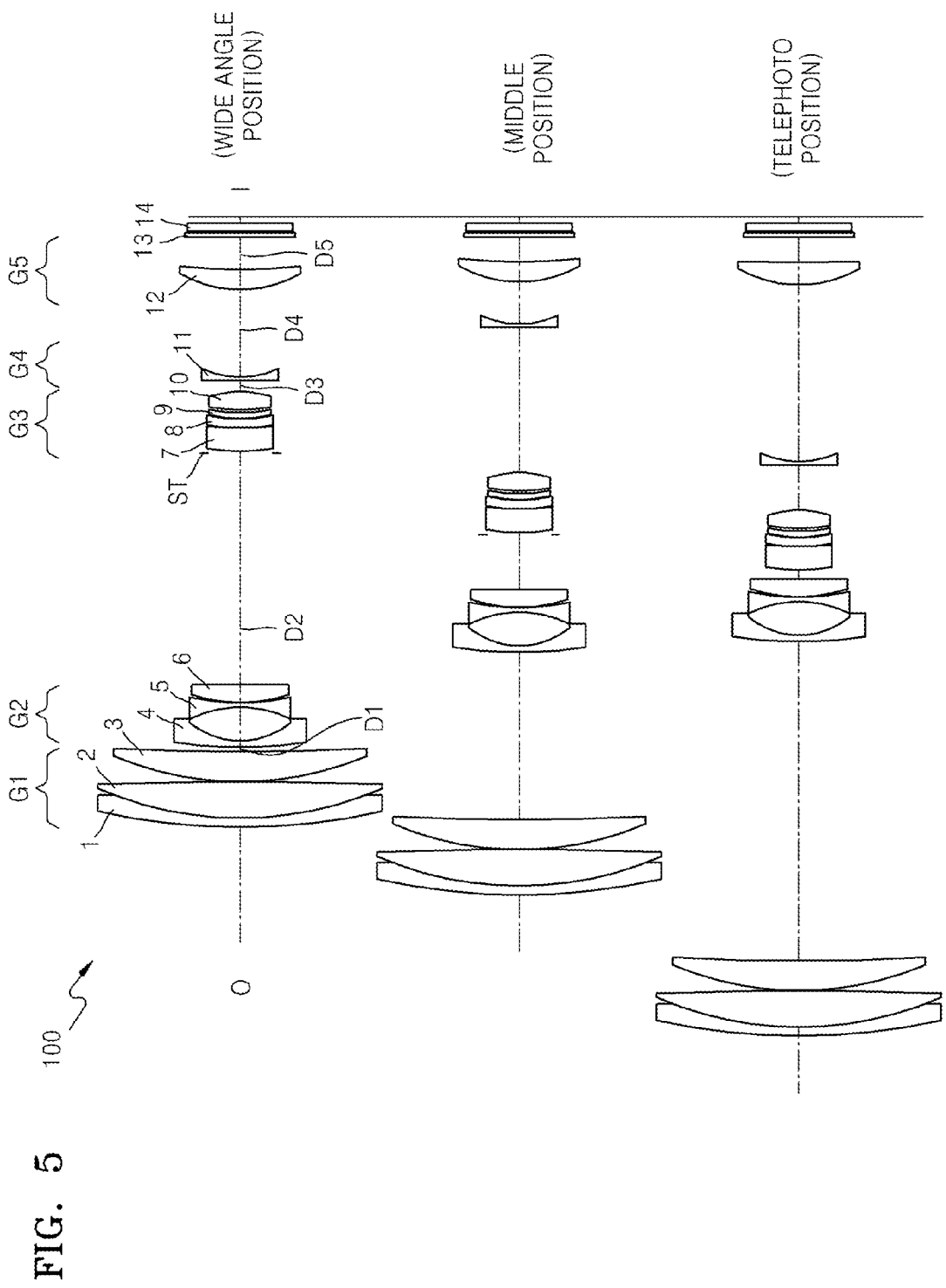
FIG. 5 is a diagram schematically illustrating a zoom lens at a wide angle position, a middle position, and a telephoto position, according to a third embodiment.

FIG. 5 is a diagram illustrating a zoom lens at a wide angle position, a middle position, and a telephoto position, according to a third embodiment. The following table shows design data according to the third embodiment. The values for the total focal length "f", the F number "Fno", and the viewing angle "2ω" at the wide angle position, the middle position, and the telephoto position are respectively shown below.

f: 4.42~21.24~88.52   Fno: 3.35~4.95~5.45   2ω: 84.21~21.32~5.17

TABLE 5

| Lens Surface | R | Dn | Nd | Vd |
|---|---|---|---|---|
| OBJ | INFINITY | INFINITY | | |
| S1 | 49.06970 | 0.800000 | 2.0010 | 29.134 |
| S2 | 29.06591 | 3.062803 | 1.496997 | 81.6084 |
| S3 | −128.34442 | 0.120000 | | |
| S4 | 23.07673 | 2.267798 | 1.600211 | 66.9561 |
| S5 | 79.69092 | D1 | | |
| S6 | 55.72715 | 0.400000 | 1.816016 | 40.5858 |

ASP:
K: 0.000000
A: −.295050E−04   B: 0.256881E−05   C: 0.100888E−06   D: −.349908E−08

| | | | | |
|---|---|---|---|---|
| S7 | 6.12972 | 2.732623 | | |

ASP:
K: 0.000000
A: 0.155432E−03   B: 0.799302E−05   C: 0.142841E−06   D: 0.766896E−07

| | | | | |
|---|---|---|---|---|
| S8 | −11.16586 | 0.400000 | 1.785786 | 48.2353 |
| S9 | 17.42026 | 0.100000 | | |
| S10 | 12.20858 | 1.341167 | 2.1021 | 16.771 |
| S11 | 63.46727 | D2 | | |
| ST | INFINITY | 0.100000 | | |
| S13 | 6.18408 | 1.516469 | 1.784681 | 39.7019 |

ASP:
K: 0.304575
A: 0.542247E−04   B: 0.729273E−05   C: 0.000000E+00   D: 0.000000E+00

| | | | | |
|---|---|---|---|---|
| S14 | 14.43990 | 0.100000 | | |

TABLE 5-continued

ASP:
K: 0.000000
A: 0.962086E−03   B: 0.246665E−04   C: 0.000000E+00   D: 0.000000E+00

| | | | | |
|---|---|---|---|---|
| S15 | 7.61794 | 0.766995 | 1.516798 | 64.1983 |
| S16 | 12.69450 | 0.400000 | 1.923918 | 20.7238 |
| S17 | 5.75538 | 0.397439 | | |
| S18 | 12.42956 | 1.372651 | 1.491334 | 74.6177 |
| S19 | −8.96890 | D3 | | |
| S20 | 60.36052 | 0.450000 | 1.531200 | 56.5000 |

ASP:
K: −1.000000
A: 0.260214E−03   B: 0.481518E−04   C: −.165184E−05   D: −.125664E−06

| | | | | |
|---|---|---|---|---|
| S21 | 10.29484 | D4 | | |

ASP:
K: 0.937163
CUF: 0.000000
A: 0.226587E−03   B: 0.506354E−04   C: −.308893E−06   D: −.211198E−06

| | | | | |
|---|---|---|---|---|
| S22 | 10.39744 | 1.577632 | 1.531200 | 56.5000 |

ASP:
K: 0.000000
A: −.752175E−04   B: 0.518044E−05   C: 0.000000E+00   D: 0.000000E+00

| | | | | |
|---|---|---|---|---|
| S23 | 51.40614 | D5 | | |

ASP:
K: 0.000000
A: −.221728E−03   B: 0.137885E−05   C: 0.000000E+00   D: 0.000000E+00

| | | | | |
|---|---|---|---|---|
| S24 | INFINITY | 0.300000 | 1.516798 | 64.1983 |
| S25 | INFINITY | 0.300000 | | |
| S26 | INFINITY | 0.500000 | 1.516798 | 64.1983 |
| S27 | INFINITY | 0.400000 | | |
| IMG: | INFINITY | | | |

The following table shows a variable distance during zooming according to the third embodiment.

TABLE 6

| Variable Distance | Wide Angle Position | Middle Position | Telephoto Position |
|---|---|---|---|
| D1 | 0.5 | 13.6688 | 26.3548 |
| D2 | 18.6040 | 4.7081 | 0.5 |
| D3 | 1.9124 | 12.2715 | 4.1164 |
| D4 | 6.9238 | 3.4952 | 14.5781 |
| D5 | 2.89 | 2.327 | 2.502 |

Figure 6A:
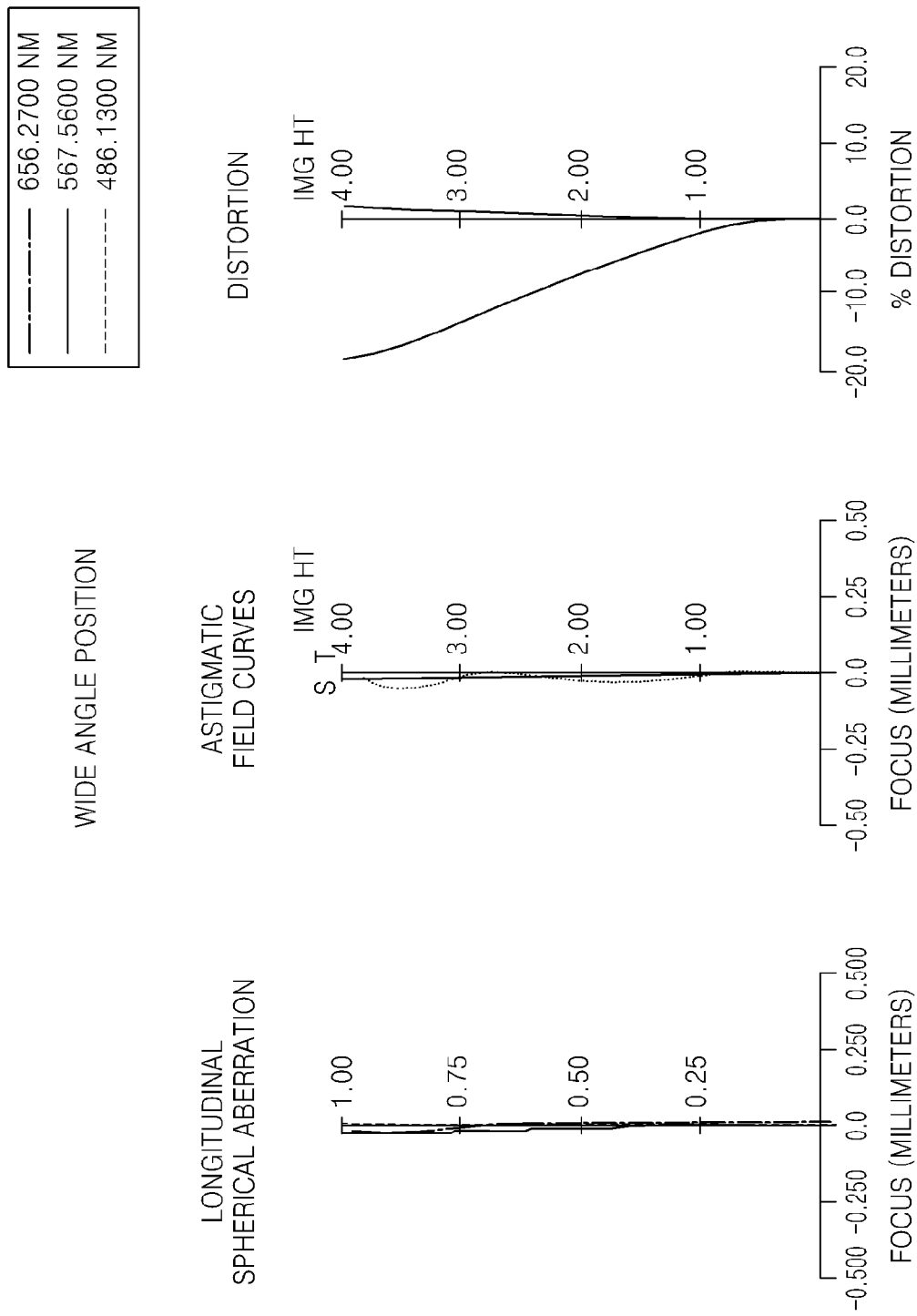
FIGS. 6A and 6B are aberration diagrams of the zoom lens of FIG. 5 at the wide angle position and the telephoto position.
Figure 6B:
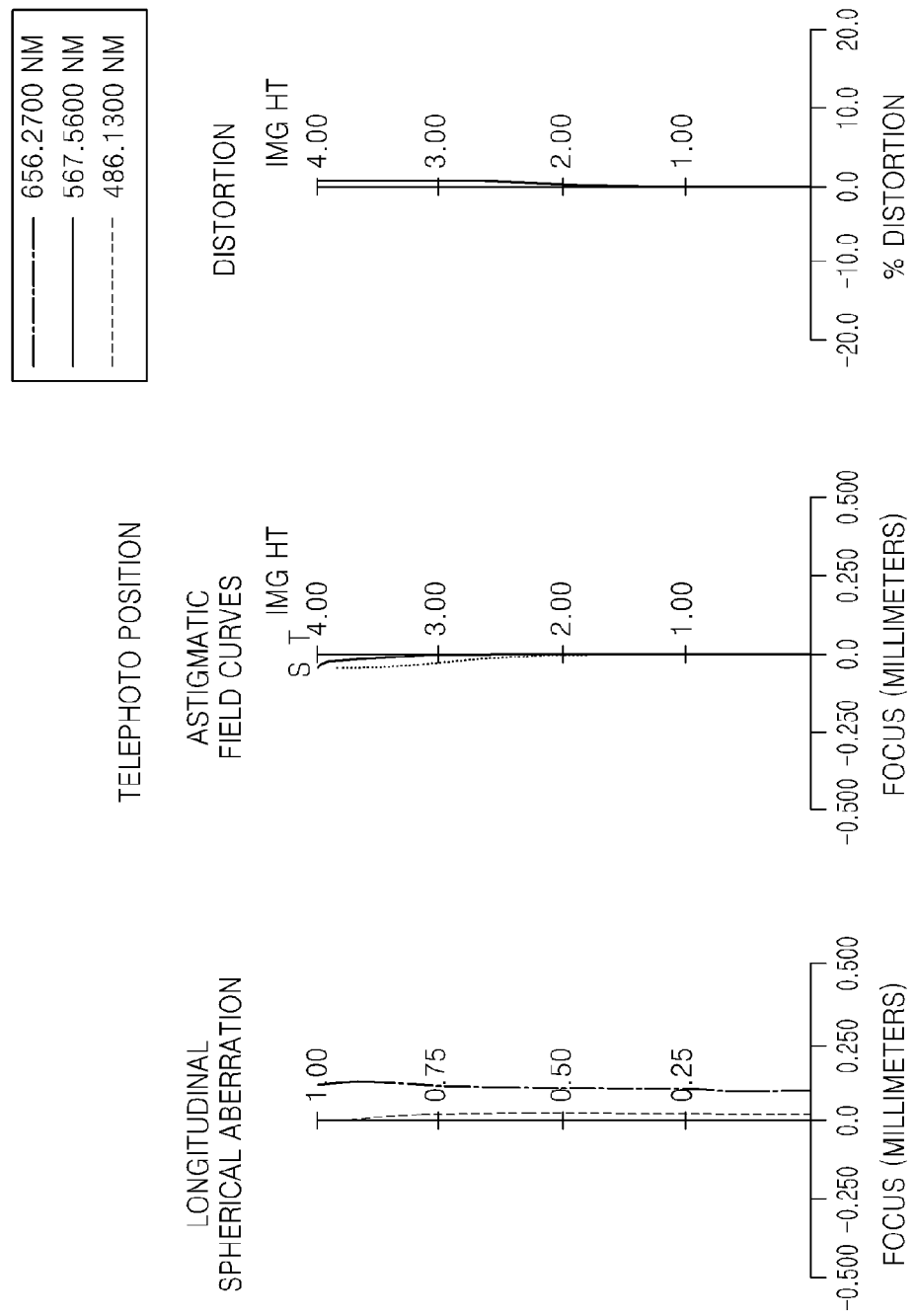

FIGS. 6A and 6B are aberration diagrams showing longitudinal spherical aberration, astigmatic field curves, and distortion of the zoom lens 100 of FIG. 5 at the wide angle position and the telephoto position.

Fourth Embodiment

Figure 7:
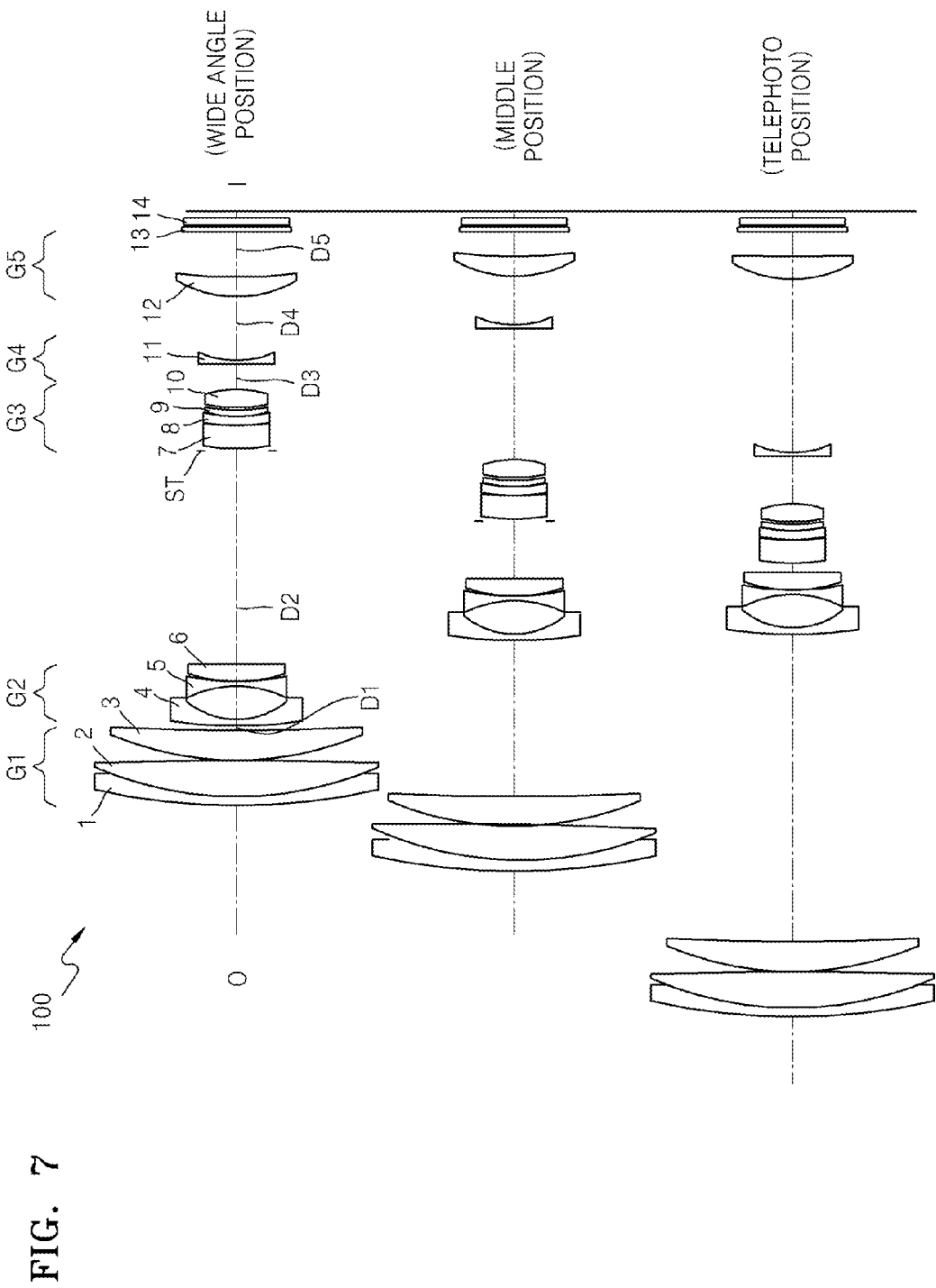
FIG. 7 is a diagram schematically illustrating a zoom lens at a wide angle position, a middle position, and a telephoto position, according to a fourth embodiment.

FIG. 7 is a diagram illustrating a zoom lens 100 at a wide angle position, a middle position, and a telephoto position, according to a fourth embodiment. The following table shows design data according to the third embodiment. The values for the total focal length "f", the F number "Fno", and the viewing angle "2ω" at the wide angle position, the middle position, and the telephoto position are respectively shown below.

f: 4.42~19.91~84.09   Fno: 3.20~4.82~5.42   2ω: 84.21~22.71~5.44

TABLE 7

| Lens Surface | R | Dn | Nd | Vd |
|---|---|---|---|---|
| OBJ | INFINITY | INFINITY | | |
| S1 | 45.65737 | 0.800000 | 1.968356 | 29.7837 |

TABLE 7-continued

| | | | | |
|---|---|---|---|---|
| S2 | 27.19229 | 3.226807 | 1.437001 | 95.1004 |
| S3 | −120.62589 | 0.120000 | | |
| S4 | 22.02983 | 2.433855 | 1.617998 | 63.3959 |
| S5 | 76.49423 | D1 | | |
| S6 | 71.85470 | 0.400000 | 1.801387 | 45.4497 |
| ASP: | | | | |
| K: 0.000000 | | | | |
| A: 0.110159E−04 | B: 0.211130E−05 | C: 0.102019E−06 | D: −0.323959E−08 | |
| S7 | 6.27772 | 2.729404 | | |
| ASP: | | | | |
| K: 0.000000 | | | | |
| A: 0.165710E−03 | B: 0.135949E−04 | C: 0.454704E−06 | D: 0.945609E−07 | |
| S8 | −11.30335 | 0.400000 | 1.772500 | 49.6243 |
| S9 | 14.40849 | 0.100000 | | |
| S10 | 11.60087 | 1.471596 | 2.0027 | 19.317 |
| S11 | 226.18969 | D2 | | |
| ST | INFINITY | 0.100000 | | |
| S13 | 6.15154 | 1.377964 | 1.761460 | 41.4111 |
| ASP: | | | | |
| K: 0.302339 | | | | |
| A: 0.546176E−04 | B: 0.698823E−05 | C: 0.000000E+00 | D: 0.000000E+00 | |
| S14 | 14.67729 | 0.100000 | | |
| ASP: | | | | |
| K: 0.000000 | | | | |
| A: 0.954150E−03 | B: 0.221384E−04 | C: 0.000000E+00 | D: 0.000000E+00 | |
| S15 | 7.75767 | 0.751378 | 1.516798 | 64.1983 |
| S16 | 12.85574 | 0.400000 | 1.905552 | 21.4363 |
| S17 | 5.77364 | 0.403580 | | |
| S18 | 12.78550 | 1.393697 | 1.493085 | 76.6638 |
| S19 | −8.82101 | D3 | | |
| S20 | 1000.00000 | 0.450000 | 1.530000 | 58.0000 |
| ASP: | | | | |
| K: −1.000000 | | | | |
| A: 0.212312E−03 | B: 0.474403E−04 | C: −.173833E−05 | D: −.110990E−06 | |
| S21 | 12.04129 | D4 | | |
| ASP: | | | | |
| K: 0.728040 | | | | |
| CUF: 0.000000 | | | | |
| A: 0.217223E−03 | B: 0.501662E−04 | C: −0.336299E−06 | D: −0.195783E−06 | |
| S22 | 13.19169 | 1.441719 | 1.570000 | 56.0000 |
| ASP: | | | | |
| K: 0.000000 | | | | |
| CUF: 0.000000 | | | | |
| A: 0.113963E−03 | B: 0.100267E−05 | C: 0.000000E+00 | D: 0.000000E+00 | |
| S23 | 2065.33705 | D5 | | |
| ASP: | | | | |
| K: 0.000000 | | | | |
| CUF: 0.000000 | | | | |
| A: 0.162101E−03 | B: −0.610687E−05 | C: 0.000000E+00 | D: 0.000000E+00 | |
| S24 | INFINITY | 0.300000 | 1.516798 | 64.1983 |
| S25 | INFINITY | 0.300000 | | |
| S26 | INFINITY | 0.500000 | 1.516798 | 64.1983 |
| S27 | INFINITY | 0.400000 | | |
| IMG: | INFINITY | | | |

The following table shows a variable distance during zooming according to the fourth embodiment.

TABLE 8

| Variable Distance | Wide Angle Position | Middle Position | Telephoto Position |
|---|---|---|---|
| D1 | 0.5 | 12.9999 | 26.0116 |
| D2 | 18.1094 | 4.8810 | 0.5 |
| D3 | 1.9124 | 12.2715 | 4.1164 |
| D4 | 5.1444 | 4.0099 | 14.8197 |
| D5 | 4.0751 | 2.3263 | 2.000 |

Figure 8A:
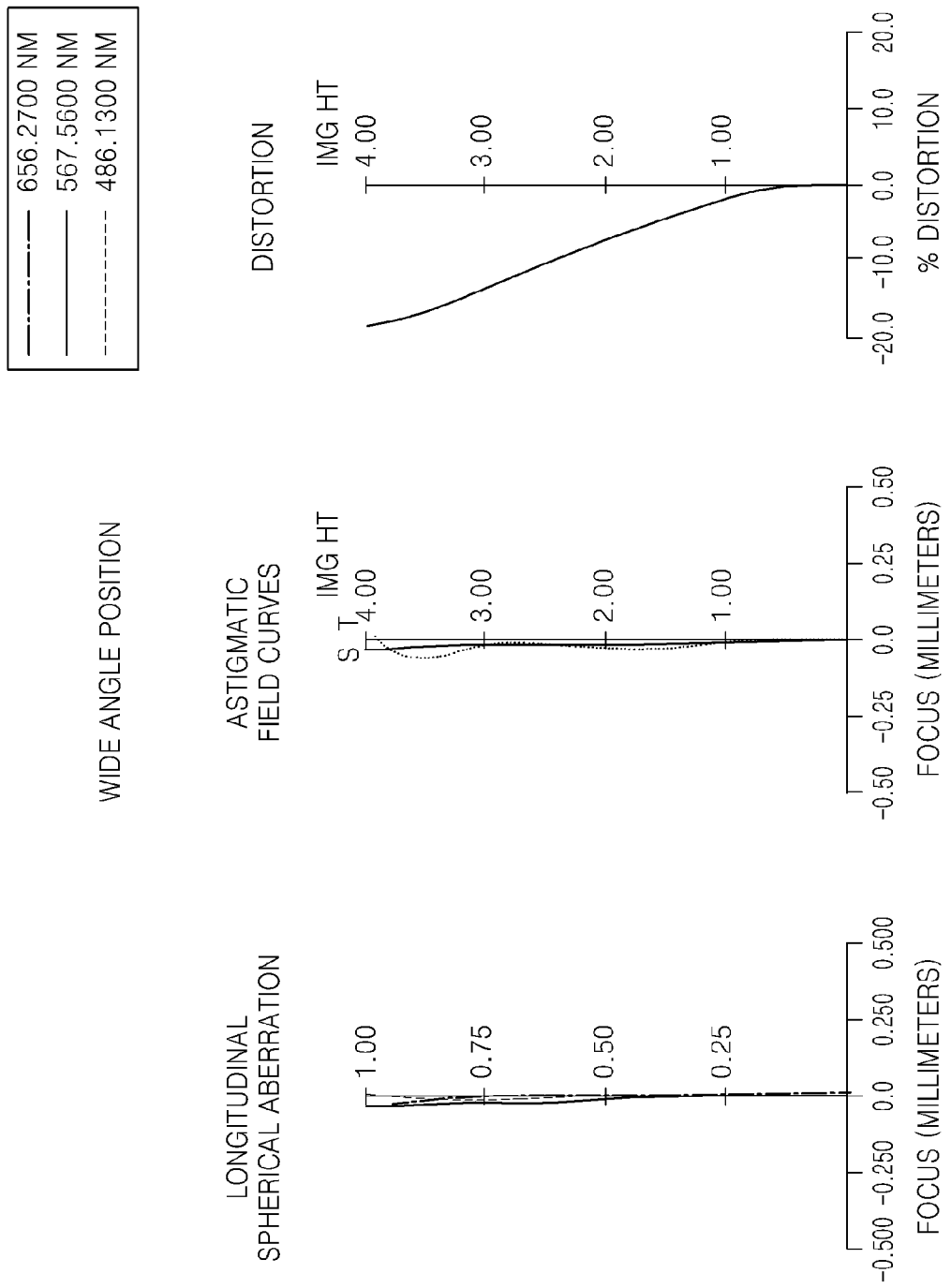

FIGS. 8A and 8B are aberration diagrams showing longitudinal spherical aberration, astigmatic field curves, and distortion of the zoom lens 100 of FIG. 7 at the wide angle position and the telephoto position.

The following table shows that the first through fourth embodiments satisfy Inequalities 1 through 4.

TABLE 9

| | $1^{st}$ Embodiment | $2^{nd}$ Embodiment | $3^{rd}$ Embodiment | $4^{th}$ Embodiment |
|---|---|---|---|---|
| Inequality 1 | 0.504 | 0.504 | 0.504 | 0.531 |
| Inequality 2 | 2.102 | 2.102 | 2.102 | 2.003 |
| Inequality 3 | 1.593 | 1.593 | 1.593 | 1.53 |
| Inequality 4 | 1.593 | 1.593 | 1.593 | 1.75 |

Figure 9:
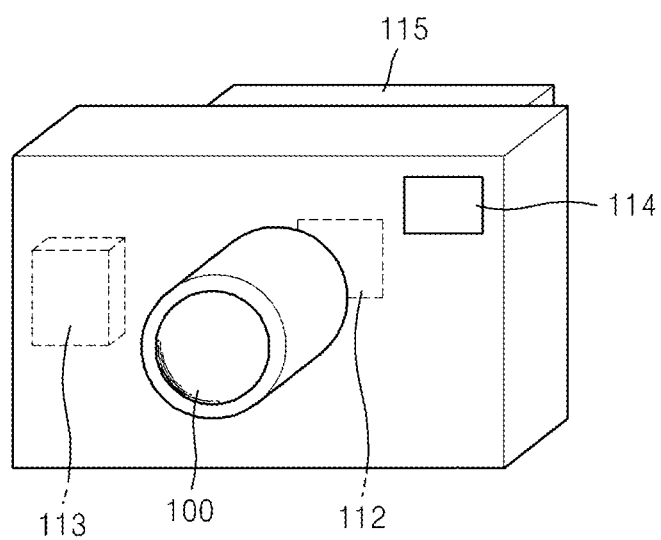
FIG. 9 is a perspective view schematically illustrating a photographing apparatus, according to an embodiment.

FIG. 9 illustrates a photographing apparatus having the zoom lens 100, according to an embodiment. The photographing apparatus includes the zoom lens 100 according to an above-described embodiment, and an imaging device 112 for receiving light passing through the zoom lens 100. The photographing device may include a recording unit 113 for recording information corresponding to an object image that is photoelectrically converted by the imaging device 112, and a viewfinder 114 used to observe the object image. The photographing device may further include a display unit 115 for displaying the object image. In the present embodiment, although the viewfinder 114 and the display unit 115 are separately provided, the display unit 115 may be provided without the viewfinder 114. The photographing apparatus of FIG. 9 is a mere example of the invention. The present invention is not limited thereto and may be applied to various optical devices other than a camera. As described above, since the zoom lens according to various embodiments is applied to a photographing apparatus such as a digital camera, an optical apparatus that is compact and bright and has high magnification and high resolution may be created.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A zoom lens comprising:
    a first lens group having a positive refractive power and including a plurality of lenses;
    a second lens group having a negative refractive power;
    a third lens group having a positive refractive power and including four lenses;
    a fourth lens group having a negative refractive power and including one lens; and
    a fifth lens group having a positive refractive power and including one lens,
    wherein the first through fifth lens groups are arranged sequentially from an object side, an interval between neighboring lens groups changes during zooming from a wide angle position to a telephoto position, and the zoom lens satisfies the following inequality, $0.4 \leq n1 - n2 \leq 0.7$, where "n1" denotes a refractive index of a first lens from the object side in the first lens group, and "n2" denotes a refractive index of a second lens from the object side in the first lens group.

2. The zoom lens of claim 1, wherein the second lens group includes three lenses, and a first lens from the object side in the second lens group is an aspherical lens.

3. The zoom lens of claim 1, wherein the zoom lens further satisfies the following inequality, $1.8 \leq n6 \leq 2.2$, where "n6" denotes a refractive index of a lens closest to an image side in the second lens group.

4. The zoom lens of claim 1, wherein a first lens from the object side in the second lens group is an aspherical lens.

5. The zoom lens of claim 1, wherein the second lens group comprises an negative aspherical meniscus lens that is convex toward the object side, a biconcave negative lens, and a positive meniscus lens that is convex toward the object side.

6. The zoom lens of claim 1, wherein a first lens from the object side in the third lens group is an aspherical lens.

7. The zoom lens of claim 1, wherein the third lens group includes a doublet lens.

8. The zoom lens of claim 1, wherein the one lens included in the fourth lens group is a meniscus lens that is convex toward the object side.

9. The zoom lens of claim 1, wherein the one lens included in the fifth lens group is a meniscus lens that is convex toward the object side.

10. The zoom lens of claim 1, wherein lenses of the fourth and fifth lens groups are formed of plastic.

11. The zoom lens of claim 1, wherein the one lens of the fourth lens group and the one lens of the fifth lens groups respectively satisfy the following inequalities, $1.45 \leq n11 \leq 1.65$ and $1.45 \leq n12 \leq 1.65$, where, "n11" denotes a refractive index of the one lens included in the fourth lens group, and "n12" denotes a refractive index of the one lens included in the fifth lens group.

12. The zoom lens of claim 1, wherein the third lens group includes an aperture stop.

13. The zoom lens of claim 1, wherein the zoom lens has a zoom ratio of 15× or higher.

14. The zoom lens of claim 1, wherein three of the four lenses of the third lens group are arranged sequentially from the object side and are meniscus lenses.

15. The zoom lens of claim 14, wherein the three of the four lenses arranged sequentially from the object side in the third lens group are meniscus lenses that are convex toward the object side.

16. The zoom lens of claim 14, wherein a lens closest to an image side in the third lens group is a biconvex lens.

17. A zoom lens comprising:
    a first lens group having a positive refractive power and including a plurality of lenses;
    a second lens group having a negative refractive power;
    a third lens group having a positive refractive power;
    a fourth lens group having a negative refractive power and including one lens; and
    a fifth lens group having a positive refractive power and including one lens and performing focusing,
    wherein the first through fifth lens groups are arranged sequentially from an object side, an interval between neighboring lens groups changes during zooming from a wide angle position to a telephoto position, and the zoom lens satisfies the following inequality, $0.4 \leq n1 - n2 \leq 0.7$, where "n1" denotes a refractive index of a first lens from the object side in the first lens group, and "n2" denotes a refractive index of a second lens from the object side in the first lens group.

18. A photographing apparatus comprising:
    a zoom lens; and
    an imaging device that receives an image formed by the zoom lens,
    wherein the zoom lens comprises:
        a first lens group having a positive refractive power and including a plurality of lenses,
        a second lens group having a negative refractive power,
        a third lens group having a positive refractive power and including four lenses,
        a fourth lens group having a negative refractive power and including one lens, and
        a fifth lens group having a positive refractive power and including one lens, wherein the first through fifth lens groups are arranged sequentially from an object side, an interval between neighboring lens groups changes during zooming from a wide angle position to a telephoto position, and the zoom lens satisfies the following inequality, $$0.4 \leq n1 - n2 \leq 0.7,$$

where "n1" denotes a refractive index of a first lens from the object side in the first lens group, and "n2" denotes a refractive index of a second lens from the object side in the first lens group.

* * * * *